United States Patent
Kaltenbach et al.

(10) Patent No.: US 9,822,860 B2
(45) Date of Patent: Nov. 21, 2017

(54) POWERTRAIN FOR A VEHICLE AND METHOD FOR CARRYING OUT LOAD CHANGES

(71) Applicant: ZF Friedrichshafen AG, Friedrichshafen (DE)

(72) Inventors: Johannes Kaltenbach, Friedrichshafen (DE); Matthias Reisch, Revensburg (DE); Ulrich Kehr, Tettnang (DE); Michael Preuβ, Meersburg (DE); Kai Bornträger, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 211 days.

(21) Appl. No.: 14/774,224

(22) PCT Filed: Feb. 12, 2014

(86) PCT No.: PCT/EP2014/052684
§ 371 (c)(1),
(2) Date: Sep. 10, 2015

(87) PCT Pub. No.: WO2014/139744
PCT Pub. Date: Sep. 18, 2014

(65) Prior Publication Data
US 2016/0017968 A1   Jan. 21, 2016

(30) Foreign Application Priority Data
Mar. 12, 2013 (DE) .................. 10 2013 204 227

(51) Int. Cl.
*F16H 3/08* (2006.01)
*F16H 37/08* (2006.01)
(Continued)

(52) U.S. Cl.
CPC .......... *F16H 37/0813* (2013.01); *B60K 1/00* (2013.01); *F16H 3/08* (2013.01); *F16H 3/091* (2013.01);
(Continued)

(58) Field of Classification Search
None
See application file for complete search history.

(56) References Cited

U.S. PATENT DOCUMENTS 2,318,481 A * 5/1943 Greenlee ................. F16D 67/00
475/143
2,916,932 A * 12/1959 Patterson ............ F16H 61/0213
192/12 R
(Continued)

FOREIGN PATENT DOCUMENTS

DE   44 11 114 A1   10/1995
DE   199 17 724 A1   11/2000
(Continued)

OTHER PUBLICATIONS

German Search Report Corresponding to 10 2013 204 227.2 dated Jan. 16, 2014.
(Continued)

*Primary Examiner* — Justin Holmes
(74) *Attorney, Agent, or Firm* — Davis & Bujold PLLC; Michael J. Bujold

(57) ABSTRACT

A drive-train for a vehicle with at least one electric drive, which can be coupled via a driveshaft (2) to at least a first transmission ratio stage (i1) and a second transmission ratio stage (i2). At least one shifting mechanism is provided for engaging the transmission ratio stages (i1, i2). To carry out powershifts, the shifting mechanism includes at least one interlocking shifting element (5) and at least one frictional shifting element (6, 6A). Each of the transmission ratio
(Continued)

stages (i1, i2) can be engaged by the interlocking shifting element (5) and at least one of the transmission ratio stages (i2) can be engaged both by the interlocking shifting element (5) and by the frictional shifting element (6). Methods for carrying out a powershift, between a frictional shifting element (6, 6A) and an interlocking shifting element (5) in the drive-train, are also disclosed.

13 Claims, 3 Drawing Sheets

(51) Int. Cl.
    *B60K 1/00*     (2006.01)
    *F16H 61/04*     (2006.01)
    *F16H 3/12*     (2006.01)
    *F16H 3/54*     (2006.01)
    *F16H 3/091*     (2006.01)
    *F16H 3/48*     (2006.01)
    *F16H 3/089*     (2006.01)

(52) U.S. Cl.
    CPC ............... *F16H 3/12* (2013.01); *F16H 3/48* (2013.01); *F16H 3/54* (2013.01); *F16H 61/0403* (2013.01); *B60K 2001/001* (2013.01); *F16H 3/089* (2013.01); *F16H 2003/0818* (2013.01); *F16H 2003/0826* (2013.01); *F16H 2061/0407* (2013.01); *F16H 2061/047* (2013.01); *F16H 2061/0474* (2013.01); *F16H 2200/0021* (2013.01); *F16H 2200/0034* (2013.01); *F16H 2200/2005* (2013.01); *F16H 2200/2007* (2013.01); *F16H 2200/2033* (2013.01); *F16H 2200/2064* (2013.01); *F16H 2200/2094* (2013.01); *F16H 2306/46* (2013.01); *F16H 2306/50* (2013.01)

(56) References Cited

U.S. PATENT DOCUMENTS

| | | | | |
|---|---|---|---|---|
| 3,468,192 | A | * | 9/1969 | Nasvytis ................ F16H 3/728 475/218 |
| 5,718,148 | A | * | 2/1998 | Bender ................ F16H 3/091 475/198 |
| 5,819,601 | A | | 10/1998 | Kuhn |
| 6,591,705 | B1 | | 7/2003 | Reik et al. |
| 6,887,180 | B2 | * | 5/2005 | Pels ........................ B60K 6/36 477/3 |
| 8,182,391 | B2 | * | 5/2012 | Klemen ................ B60K 6/365 180/65.265 |
| 8,562,480 | B1 | * | 10/2013 | Mellet .................... F16H 3/725 475/317 |
| 2003/0100985 | A1 | * | 5/2003 | Matsumura ........... B60W 10/02 701/55 |
| 2010/0173746 | A1 | * | 7/2010 | Ideshio ................. B60K 6/365 477/36 |

FOREIGN PATENT DOCUMENTS

| | | |
|---|---|---|
| EP | 2 060 828 A1 | 5/2009 |
| EP | 2 098 742 A1 | 9/2009 |
| FR | 2 952 416 A1 | 5/2011 |
| GB | 2 375 576 A | 11/2002 |
| JP | 2006-082748 A | 3/2006 |
| WO | 99/33682 A2 | 7/1999 |

OTHER PUBLICATIONS

International Search Report Corresponding to PCT/EP2014/052684 dated Aug. 14, 2014.
Written Opinion Corresponding to PCT/EP2014/052684 dated Aug. 14, 2014.

* cited by examiner

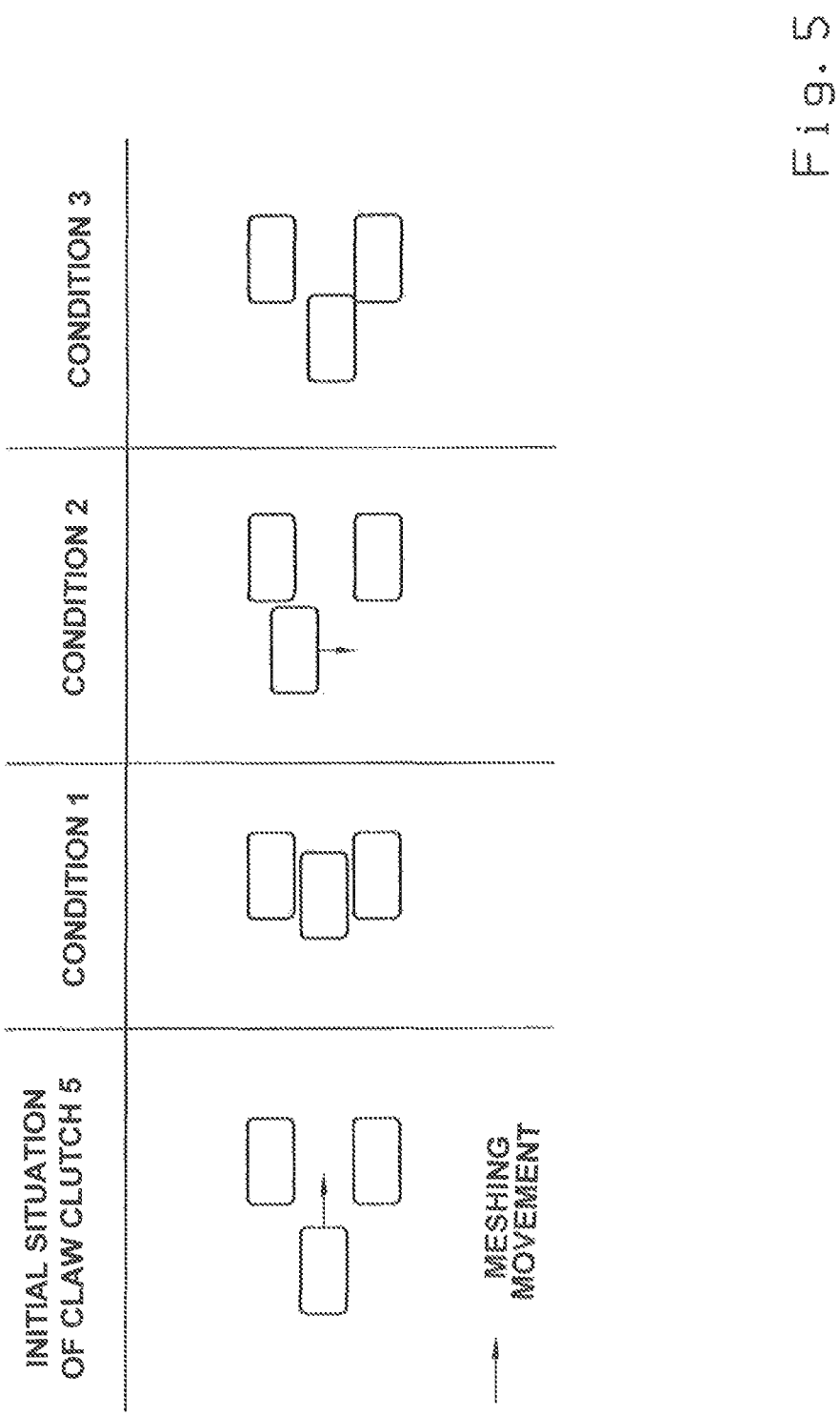

POWERTRAIN FOR A VEHICLE AND METHOD FOR CARRYING OUT LOAD CHANGES

This application is a National Stage completion of PCT/EP2014/052684 filed Feb. 12, 2014, which claims priority from German patent application serial no. 10 2013 204 227.2 filed Mar. 12, 2013.

FIELD OF THE INVENTION

The present invention concerns a drive-train for a. In addition the invention concerns methods for carrying out a powershift between a frictional shifting element and an interlocking shifting element, in particular in the drive-train according to the invention.

BACKGROUND OF THE INVENTION

Drive-trains with automated transmissions are known, that use interlocking shifting elements with which, however, only shifts with traction force interruption are possible. In addition drive-trains with powershift transmissions such as dual-clutch transmissions and automatic transmissions are known, in which frictional shifting elements are used in order to carry out shifts while maintaining the traction force.

For example, from the document DE 199 17 724 A1 a drive-train for a motor vehicle is known. The drive-train comprises an electric motor and a two-gear transmission that comprises two loose wheels mounted to rotate on a shaft and which can be engaged by two associated disk clutches in order to transmit torque at an intermediate axle differential to the drive input of the vehicle.

In powershift transmissions, for safety reasons frictional shifting elements are designed as disk clutches that are held open, or 'normally open', i.e. which open under spring force so that if the actuating system fails the blocking of the transmission due to two simultaneously engaged gears is prevented. On the other hand, this means that a shifting element of this type has to be permanently kept in its engaged condition by an actuator. Since the clutch rotates, the transmission of rotation for example by virtue of axial bearings or hydraulic rotary ducts is necessary. However, such rotary transmissions give rise to losses that are responsible for substantial efficiency losses, particularly in the case of electric drives.

SUMMARY OF THE INVENTION

Consequently, the purpose of the present invention is to propose a drive-train and methods of the type described at the start, with which powershifts can be carried out safely and with the highest possible efficiency.

According to the invention these objectives are achieved by the characteristics and advantageous design features as described in the description and the drawings.

A drive-train for a vehicle is proposed, in particular for a motor vehicle with at least one electric drive, which can be coupled by way of a driveshaft to at least a first gear ratio stage and a second gear ratio stage. Associated with the gear ratio stages there is at least one shifting mechanism for engaging the gear ratio stages. According to the invention, an interlocking shifting element and at least one frictional shifting element are provided as the shifting mechanism. To carry out powershifts, in the proposed drive-train it is provided that each of the gear ratio stages can be engaged with the interlocking shifting element and at least one of the gear ratio stages can be engaged with both the interlocking shifting element and also the frictional shifting element.

Consequently, with the drive-train proposed according to the invention a shifting mechanism of virtually dual design with an interlocking and a frictional shifting element is used, such that the powershift is carried out with the help of the frictional shifting element and once the shift has been completed, the interlocking shifting element can take over the efficiency-optimized torque transmission.

The drive-train is not limited to two-gear transmissions. It is possible without problems also to provide further gear planes or planetary gearsets with additional shifting elements. For example, between the drive unit and the driveshaft a preliminary gear or the like can be arranged, in order to reduce the rotational speed level at the driveshaft.

The transmission ratio stages provided in the drive-train according to the invention can be spur gear stages, planetary gearsets or suchlike. As the interlocking shifting element preferably a claw clutch can be provided, which is preferably in the form of a double claw clutch in order to give two further shift positions in addition to the neutral position. It is also conceivable to use single-action shifting elements.

As the frictional shifting element a disk clutch can preferably be used, which in its non-actuated, starting position is held open, for example by spring force. Other disk clutches too can be used.

Furthermore, methods are also proposed for carrying out a powershift between a frictional shifting element and an interlocking shifting element, in particular in the drive-train according to the invention.

In a powershift from the closed frictional shifting element to the open interlocking shifting element, the meshing movement can be monitored by a path sensor.

For example, the frictional shifting element can be opened when, on the basis of the meshing movement detected, complete meshing is recognized. But for instance, if the meshing movement detected leads to the recognition of a tooth-on-tooth position at the interlocking shifting element, the frictional shifting element can be opened slowly in order to produce a rotational speed difference. Once this rotational speed difference has been produced, the closing of the interlocking shifting element is resumed and the frictional shifting element is then opened when the meshing movement has been completed. As an emergency measure, to resolve a tooth-on-tooth position a load reduction can be carried out until complete meshing has occurred.

If on the basis of the meshing movement detected, partial meshing of the interlocking shifting element is recognized, the interlocking shifting element can be opened again and the frictional shifting element can be partially opened to produce a slipping condition and then closed again, so that a new orientation is reached in the interlocking shifting element to resolve the tooth-on-tooth position.

In an alternative method according to the invention, a strategic decision can be made whether the frictional shifting element or friction clutch should remain closed in the second gear, therefore accepting the actuator losses, or whether the change from the frictional shifting element to the interlocking shifting element should take place.

A forward-looking strategy in the context of the method can provide that the carrying out of a powershift depends on an evaluation of vehicle data and/or topographical data.

A further alternative method can provide that the frictional shifting element is kept closed after a gearshift until a load reduction or a load change from traction loading to thrust loading is carried out, in order then to carry out a load-free powershift between the frictional shifting element and the interlocking shifting element.

BRIEF DESCRIPTION OF THE DRAWINGS

Below, the invention is explained further with reference to the drawings, which show:

FIG. 5: A schematic view showing various conditions in relation to which various procedures according to the invention are described.

DETAILED DESCRIPTION OF THE PREFERRED EMBODIMENTS

Figure 1:
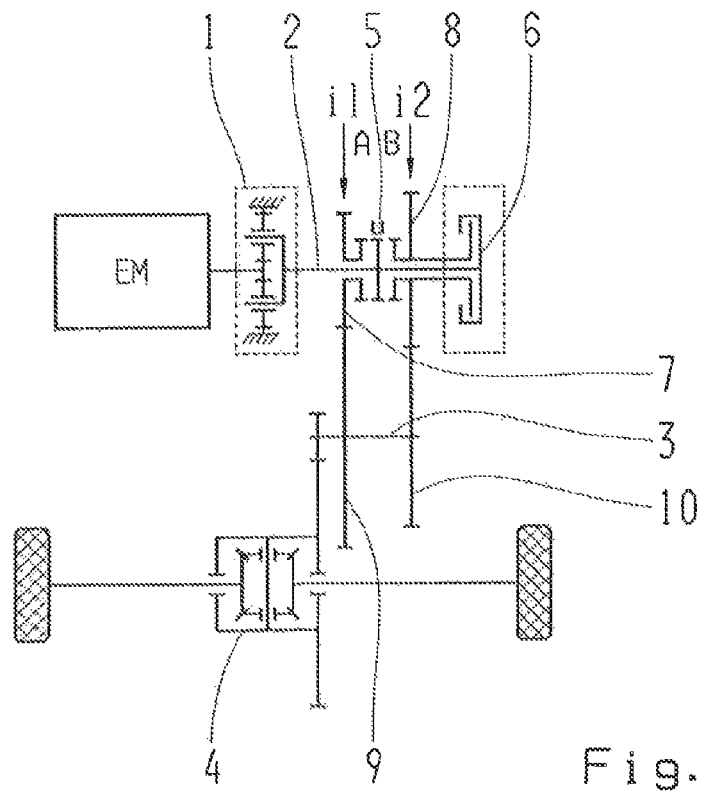
FIG. 1: A schematic view of a first embodiment variant of a drive-train according to the invention, with spur gear stages that can be engaged on the driveshaft side as transmission ratio stages.

FIGS. 1 to 4 show as examples various embodiment variants of a drive-train for a vehicle according to the invention, in particular a motor vehicle. As its electric drive the drive-train comprises an electric machine EM, which drives a driveshaft 2 directly or via a preliminary gear 1. In addition at least two transmission ratio stages i1 and i2 are provided, which are connected by way of an intermediate shaft 3 to a drive output differential 4 of the vehicle to drive the drive wheels of the vehicle. Associated with the transmission ratio stages i1, i2 is a shifting mechanism which, for carrying out powershifts, comprises both an interlocking shifting element 5 and a frictional shifting element 6.

FIG. 1 shows a first embodiment variant of the drive-train according to the invention, in which the transmission ratio stages i1 and i2 are in the form of spur gear stages. A loose wheel 7 of the first transmission ratio stage i1 and a loose wheel 8 of the second transmission ratio stage i2 are associated with the driveshaft 2 and can be connected to the driveshaft 2 by means of the interlocking shifting element 5.

In shift position A of the interlocking shifting element 5 the loose wheel 7, and in shift position B the loose wheel 8 is connected to the driveshaft 2. The fixed wheel 9 of the first transmission ratio stage i1 and the fixed wheel 10 of the second transmission ratio stage i2 are connected by way of the intermediate shaft 3 to the drive output differential 4 for driving the drive wheels of the vehicle. By means of the frictional shifting element 6 the loose wheel 8 of the second transmission ratio stage i2 can also be connected to the driveshaft 2 in order to enable powershifts.

Figure 2:
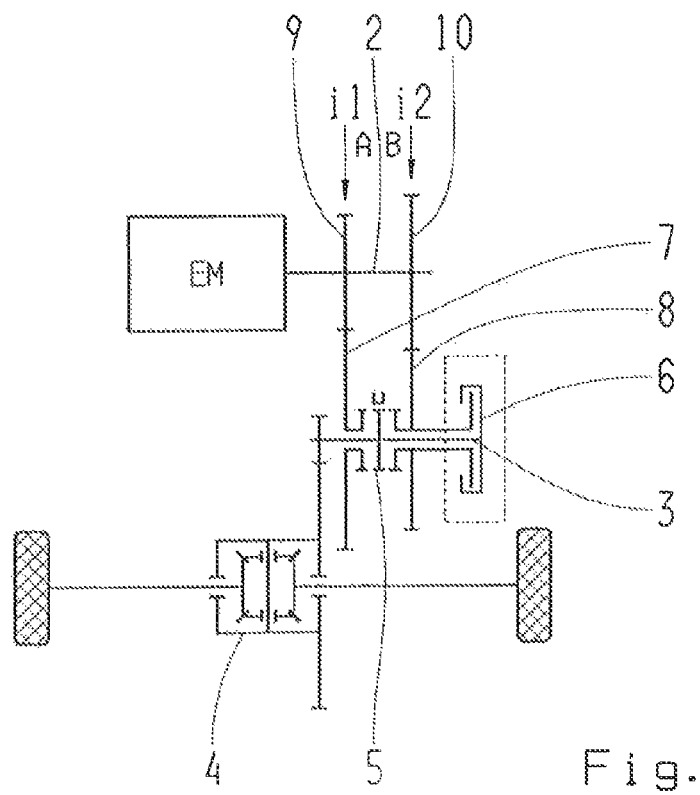
FIG. 2: A schematic view of a second embodiment variant of the drive-train according to the invention, with spur gear stages that can be engaged on the intermediate shaft side as transmission ratio stages.

FIG. 2 shows a second embodiment variant of the drive-train, in which, otherwise than in the first embodiment variant according to FIG. 1, the loose wheels 7, 8 of the two transmission ratio stages i1 and i2 are associated with the intermediate shaft 3 so that they can be engaged by means of the shifting elements 5 and 6 also associated with the intermediate shaft 3. This has the advantage that the spur gears of the transmission ratio stages i1 and i2 can have larger diameters.

Regardless of which of the two embodiment variants is concerned, for example a traction upshift from the transmission ratio stage i1 to the second transmission ratio stage i2 can be carried out since load uptake takes place by the frictional shifting element 6 and the interlocking shifting element 5 is moved from its shift position A to the neutral position in order to enable a rotational speed adaptation or rotational speed synchronization by the frictional shifting element 6, until the shifting element 6 has closed. In the closed condition of the frictional shifting element 6, the interlocking shifting element 5 can be moved to shift position B and the frictional shifting element 6 can be opened slowly, so that then the torque transmission can take place exclusively by way of the interlocking shifting element 5.

To resolve for example a tooth-on-tooth position at the interlocking shifting element 5, the frictional shifting element 6 can be opened slowly in order to enable meshing when a rotational speed difference has been produced. Particularly when a disk clutch of the 'normally open' type is used as the frictional shifting element 6, this is only actuated for a short time and thereby only small actuation losses occur.

Figure 3:
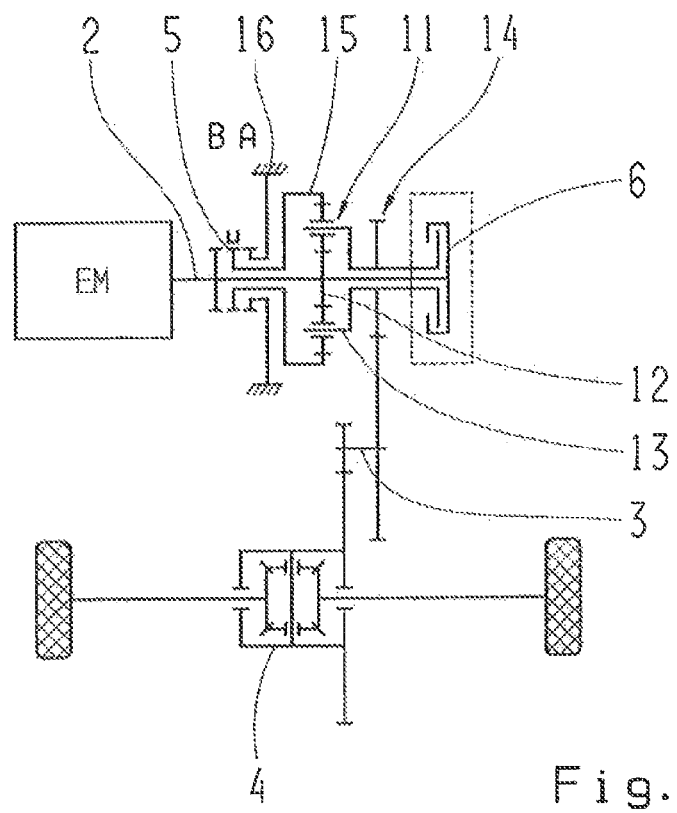
FIG. 3: A schematic view of a third embodiment variant of the drive-train, with transmission ratio stages in the form of a planetary gearset.

FIG. 3 shows a third embodiment variant of the drive-train, in which the transmission ratio stages i1, i2 are realized by a planetary gearset 11. The sun gear 12 of the planetary gearset 11 is connected to the driveshaft 2. The planetary carrier 13 of the planetary gearset 11 is connected to a drive output stage 14, which is connected to the drive output differential 4 by way of the intermediate shaft 3. The planetary carrier 13 can also be connected to the driveshaft 2 by means of the frictional shifting element 6. The ring gear 15 of the planetary gearset 11 can be connected by means of the interlocking shifting element 5 to the driveshaft 2 in shift position B or to the housing 16 in shift position A.

Thus, the two transmission ratio stages i1, i2 are realized by the planetary gearset 11. In this third embodiment variant as well, the second gear can be engaged both by the interlocking shifting element 5 and by the frictional shifting element 6. In this embodiment variant, by means of the interlocking shifting element 5 and the frictional shifting element 6 various shafts can be connected to one another, such that both act via the same gear so that a direct drive of the planetary gearset 11 can be realized.

Figure 4:
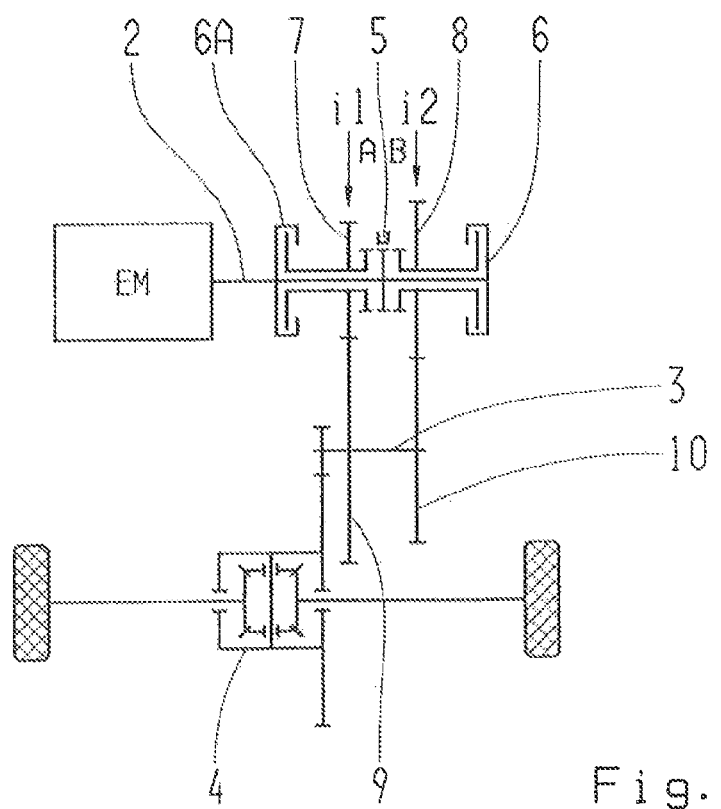
FIG. 4: A schematic view of a fourth embodiment variant of the drive-train, with two frictional shifting elements associated with the transmission ratio stages.

FIG. 4 shows a fourth embodiment variant in which, otherwise than in the first embodiment variant according to FIG. 1, a further frictional shifting element 6A is provided so that full powershifting ability can be realized, since all the gearshifts can be carried out with the help of the two frictional shifting elements 6, 6A so that even overdrive downshifts for recuperation can be carried out as powershifts.

Regardless of the embodiment variants concerned, the design of the drive-train proposed enables a modular concept to be implemented.

Methods based on the drive-train according to the invention for carrying out a powershift between a frictional shifting element 6, 6A and an interlocking shifting element 5 are also claimed.

In one method a strategic decision is made whether the frictional shifting element 6 remains closed in the second gear while accepting actuator losses, or whether the shift to the interlocking shifting element 5 should take place. The procedures according to the invention are explained in more detail with reference to the conditions 1 to 3 illustrated in FIG. 5, wherein for example the interlocking shifting element 5 is in the form of a claw clutch.

The condition is described with reference to the initial situation of the interlocking shifting element or claw clutch 5, in that the claw clutch is in its condition before its meshing movement begins. Condition 1 describes the case when the claw clutch is fully meshed, when by chance the teeth coincide with gaps. Condition 2 describes the case when the claw clutch cannot mesh because a tooth-on-tooth position has occurred. Finally, condition 3 represents the case when, owing to the claw geometry, the claw clutch meshes only partially. In this case, for example, the claws remain stuck on chamfers.

Beginning with the initial situation in which the interlocking shifting element 5 is open and the frictional shifting element 6, 6A is closed, driving is for example taking place in the second gear in which the electric drive EM supplies the drive torque. To close the interlocking shifting element 5 this is correspondingly actuated and the meshing movement begins at a rotational speed difference of zero. In condition 1 meshing takes place without problems. In condition 2 the meshing movement is interrupted because a tooth-on-tooth position has occurred. In condition 3 only partial meshing takes place owing to the claw geometry. By virtue of a path sensor of the actuator the conditions 1 to 3 described above can be distinguished.

In condition 1 the frictional shifting element 6, 6A can be opened. In condition 2 the frictional shifting element 6, 6A is opened slowly so that a rotational speed difference is produced. When the rotational speed difference is beginning, i.e. when an angle change occurs, the claw clutch can mesh when under no load so long as there is enough play until the next tooth flank. As a safety function, the load can be reduced at the electric drive EM when the claw clutch should not mesh completely. This is an emergency measure in rare cases, and involves acceptance of a very brief traction force interruption. In condition 3 the actuator is reversed again so that the claws of the claw clutch are no longer in contact. Then, the frictional clutch or frictional shifting element 6, 6A is briefly partially opened, imperceptibly for the driver, and thereby brought to a slipping condition before being closed again, so that the halves of the claw are differently orientated as regards their rotation angle. A renewed attempt to mesh the clutch is then carried out.

For example, in the context of a forward-looking strategy the following can be provided for: when the need for a downshift from the second to the first gear is foreseen, the frictional shifting element 6 can remain closed. For this, vehicle data can be evaluated, for example the driving resistance can be calculated on the basis of an acceleration balance or, in addition, topographical data can be evaluated.

Basically, it can for example be provided that if the driving resistance is expected to be high, for example on an uphill stretch, the frictional shifting element 6 can remain closed and the interlocking shifting element 5 is not engaged, in order to be able to carry out a downshift as the vehicle slows down.

In an alternative method, after a shift from the first to the second gear the frictional shifting element 6 can remain closed until a load reduction or load change from traction loading to thrust loading is carried out by the driver. This enables a load-free shift from the frictional shifting element 6 to the interlocking shifting element 5 without the driver being aware of it. The interlocking shifting element 5 or shifting claws can mesh under load with no problems.

INDEXES

1 Preliminary gear
2 Driveshaft
3 Intermediate shaft
4 Drive output differential
5 Interlocking shifting element or claw clutch
6, 6A Frictional shifting element or friction clutch
7 Loose wheel of the first transmission ratio stage
8 Loose wheel of the second transmission ratio stage
9 Fixed wheel of the first transmission ratio stage
10 Fixed wheel of the second transmission ratio stage
11 Planetary gearset
12 Sun gear
13 Planetary carrier
14 Drive output stage
15 Ring gear
16 Housing
i1 First transmission ratio stage
i2 Second transmission ratio stage
EM Electric drive
A Shift position
B Shift position

The invention claimed is:

1. A drive-train for a vehicle, with at least one electric drive (EM), which is couplable, via a driveshaft, to at least a first transmission ratio stage (i1) and a second transmission ratio stage (i2), at least one shifting mechanism for engaging the first and the second transmission ratio stages (i1, i2), and the at least one shifting mechanism comprising at least one interlocking shifting element (5) and at least one frictional shifting element (6, 6A) for carrying out powershifts, each of the first and the second transmission ratio stages (i1, i2) being engagable by the interlocking shifting element (5), and at least one of the first and the second transmission ratio stages (i2) being engagable by both of the interlocking shifting element (5) and the frictional shifting element (6), wherein the first and the second transmission ratio stages (i1, i2) are realized by a planetary gearset, a sun gear (12) of the planetary gearset (11) is connected to the driveshaft (2), a planetary carrier (13) is connectable, by the frictional shifting element (6) to the driveshaft, and a ring gear (15) of the planetary gearset (11) is connectable, by the interlocking shifting element (5), to either the driveshaft (2) or a housing (16).

2. The drive-train according to claim 1, wherein a direct drive is engagable, via the planetary gearset (11), by engaging the interlocking shifting element (5) and the frictional shifting element (6).

3. The drive-train according to claim 1, wherein the electric drive is an electric machine (EM).

4. The drive-train according to claim 1, wherein the frictional shifting element (6) is a 'normally open' disk clutch.

5. The drive-train according to claim 1, wherein the interlocking shifting element (5) is a claw clutch.

6. A method of carrying out a powershift between a frictional shifting element (6, 6A) and an interlocking shifting element (5) in a drive-train with at least one electric drive (EM), which is couplable, via a driveshaft, to at least a first transmission ratio stage (i1) and a second transmission ratio stage (i2), at least one shifting mechanism for engaging the first and the second transmission ratio stages (i1, i2), the shifting mechanism comprises at least one of the interlocking shifting element (5) and at least one of the frictional shifting element (6, 6A), each of the first and the second transmission ratio stages (i1, i2) is engagable by the interlocking shifting element (5) and at least one of the first and the second transmission ratio stages (i2) is engagable by both of the interlocking shifting element (5) and the frictional shifting element (6), the first and the second transmission ratio stages (i1, i2) are realized by a planetary gearset, a sun gear (12) of the planetary gearset (11) is connected to the driveshaft (2), a planetary carrier (13) is connectable, by the frictional shifting element (6), to the driveshaft (2), and a ring gear (15) of the planetary gearset (11) is connectable, by the interlocking shifting element (5), to either the driveshaft (2) or a housing (16), the method comprising:

detecting meshing movement, via a path sensor, during a powershift from an engaged frictional shifting element (6, 6A) to a disengaged interlocking shifting element (5).

7. The method according to claim 6, further comprising disengaging the frictional shifting element (6, 6A) when, based on the detected meshing movement, complete meshing is recognized.

8. The method according to claim 6, further comprising slowly disengaging the frictional shifting element (6, 6A) when, based on the detected meshing movement, a tooth-on-tooth position at the interlocking shifting element (5) is recognized in order to produce a rotational speed difference.

9. The method according to claim 8, further comprising, after a rotational speed difference is produced, again carrying out engaging of the interlocking shifting element (5) and opening disengaging the frictional shifting element (6, 6A) when the meshing movement is completed.

10. The method according to claim 8, further comprising, as an emergency measure, resolving a tooth-on-tooth position by carrying out a load reduction to allow complete meshing.

11. The method according to claim 6, further comprising:

if, on a basis of the detected meshing movement, only partial meshing of the interlocking shifting element (5) is recognized, again disengaging the interlocking shifting element (5) and then partially disengaging the frictional shifting element (6, 6A) to produce a slipping condition, and again engaging the frictional shifting element (6, 6A) so that a new orientation is produced, at the interlocking shifting element (5), in order to resolve a tooth-on-tooth position.

12. A method of carrying out a powershift between a frictional shifting element (6, 6A) and an interlocking shifting element (5) in a drive-train for a vehicle, with at least one electric drive (EM), which is couplable, via a driveshaft, to at least a first transmission ratio stage (i1) and a second transmission ratio stage (i2), at least one shifting mechanism for engaging the first and the second transmission ratio stages (i1, i2), the at least one shifting mechanism comprises the interlocking shifting element (5) and the frictional shifting element (6, 6A) for carrying out powershifts, each of the first and the second transmission ratio stages (i1, i2) is engagable by the interlocking shifting element (5) and at least one of the first and the second transmission ratio stages (i2) is engagable by both of the interlocking shifting element (5) and the frictional shifting element (6), the first and the second transmission ratio stages (i1, i2) are realized by a planetary gearset, a sun gear (12) of the planetary gearset (11) is connected to the driveshaft (2), a planetary carrier (13) is connectable, by the frictional shifting element (6), to the driveshaft (2), and a ring gear (15) of the planetary gearset (11) is connectable, by the interlocking shifting element (5), to either the driveshaft (2) or a housing (16), the method comprising:

carrying out a powershift depending on at least one of an evaluation of vehicle data and topographical data.

13. A method of carrying out a powershift between a frictional shifting element (6, 6A) and an interlocking shifting element (5) in a drive-train for a vehicle, with at least one electric drive (EM), which is couplable via a driveshaft to at least a first transmission ratio stage (i1) and a second transmission ratio stage (i2), at least one shifting mechanism for engaging the first and the second transmission ratio stages (i1, i2), the at least one shifting mechanism comprises the interlocking shifting element (5) and the frictional shifting element (6, 6A) for carrying out powershifts, each of the first and the second transmission ratio stages (i1, i2) is engagable by the interlocking shifting element (5) and at least one of the first and the second transmission ratio stages (i2) is engagable by both of the interlocking shifting element (5) and the frictional shifting element (6), the first and the second transmission ratio stages (i1, i2) are realized by a planetary gearset, a sun ear (12) of the planetary gearset (11) is connected to the driveshaft (2), a planetary carrier (13) is connectable, by the frictional shifting element (6), the driveshaft (2), and a ring gear (15) of the planetary gearset (11) is connectable, by the interlocking shifting element (5), to either the driveshaft (2) or a housing (16) the method comprising:

keeping the frictional shifting element (6, 6A) engaged, after a gearshift, until either a load reduction or a load change from traction loading to thrust loading is carried out, and carrying out a load-free powershift between the frictional shifting element (6, 6A) and the interlocking shifting element (5).

* * * * *